(12) United States Patent
Gururani et al.

(10) Patent No.: US 12,340,788 B2
(45) Date of Patent: *Jun. 24, 2025

(54) GENERATING EXPRESSIVE SPEECH AUDIO FROM TEXT DATA

(71) Applicant: Electronic Arts Inc., Redwood City, CA (US)

(72) Inventors: Siddharth Gururani, Santa Clara, CA (US); Kilol Gupta, Redwood City, CA (US); Dhaval Shah, Redwood City, CA (US); Zahra Shakeri, Newark, CA (US); Jervis Pinto, Toronto (CA); Mohsen Sardari, Burlingame, CA (US); Navid Aghdaie, San Jose, CA (US); Kazi Zaman, Foster City, CA (US)

(73) Assignee: ELECTRONIC ARTS INC., Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/656,983

(22) Filed: May 7, 2024

(65) Prior Publication Data

US 2024/0290316 A1    Aug. 29, 2024

Related U.S. Application Data

(63) Continuation of application No. 17/682,206, filed on Feb. 28, 2022, now Pat. No. 12,033,611, which is a
(Continued)

(51) Int. Cl.
*G10L 13/00* (2006.01)
*A63F 13/60* (2014.01)
(Continued)

(52) U.S. Cl.
CPC .............. *G10L 13/00* (2013.01); *A63F 13/60* (2014.09); *G06N 3/044* (2023.01); *G06N 3/08* (2013.01);
(Continued)

(58) Field of Classification Search
CPC ....... G10L 13/00; G10L 13/033; G10L 25/30; G10L 25/24; G10L 13/027; G10L 13/047;
(Continued)

(56) References Cited

U.S. PATENT DOCUMENTS 5,729,694 A    3/1998  Holzrichter
7,113,909 B2*  9/2006  Nukaga ............... G10L 13/10
                                                   704/260

(Continued)

FOREIGN PATENT DOCUMENTS

EP    3376497 A1    9/2018

OTHER PUBLICATIONS

Arik, Sercan O., et al. "Neural Voice Cloning with a Few Samples." arXiv preprint arXiv:1802.06006, Retrieved from https://arxiv.org/abs/1802.06006v3, dated 2018.
(Continued)

*Primary Examiner* — Abdelali Serrou
(74) *Attorney, Agent, or Firm* — Gray Ice Higdon

(57) ABSTRACT

A system for use in video game development to generate expressive speech audio comprises a user interface configured to receive user-input text data and a user selection of a speech style. The system includes a machine-learned synthesizer comprising a text encoder, a speech style encoder and a decoder. The machine-learned synthesizer is configured to generate one or more text encodings derived from the user-input text data, using the text encoder of the machine-learned synthesizer; generate a speech style encoding by processing a set of speech style features associated with the
(Continued)

selected speech style using the speech style encoder of the machine-learned synthesizer; combine the one or more text encodings and the speech style encoding to generate one or more combined encodings; and decode the one or more combined encodings with the decoder of the machine-learned synthesizer to generate predicted acoustic features. The system includes one or more modules configured to process the predicted acoustic features, the one or more modules comprising a machine-learned vocoder configured to generate a waveform of the expressive speech audio.

20 Claims, 4 Drawing Sheets

Related U.S. Application Data continuation of application No. 16/840,070, filed on Apr. 3, 2020, now Pat. No. 11,295,721.

(60) Provisional application No. 62/936,249, filed on Nov. 15, 2019.

(51) Int. Cl.
*G06N 3/044* (2023.01)
*G06N 3/08* (2023.01)
*A63F 13/63* (2014.01)

(52) U.S. Cl.
CPC ....... *A63F 13/63* (2014.09); *A63F 2300/6018* (2013.01)

(58) Field of Classification Search
CPC ......... G10L 13/04; G10L 13/02; G10L 13/08; G10L 13/10; G10L 13/0335; G10L 13/06; G10L 15/07; G10L 15/26; G10L 13/086; G10L 13/07
See application file for complete search history.

(56) References Cited

U.S. PATENT DOCUMENTS

| | | | |
|---|---|---|---|
| 7,249,021 B2 | 7/2007 | Morio | |
| 7,831,420 B2 | 11/2010 | Sinder | |
| 8,527,276 B1* | 9/2013 | Senior | G10L 13/02 704/258 |
| 9,159,329 B1 | 10/2015 | Agiomyrgiannakis | |
| 9,697,820 B2 | 7/2017 | Jeon | |
| 9,905,220 B2 | 2/2018 | Fructuoso | |
| 9,916,825 B2 | 3/2018 | Edrenkin | |
| 9,934,775 B2 | 4/2018 | Raitio | |
| 10,192,541 B2 | 1/2019 | Mairano | |
| 10,249,289 B2 | 4/2019 | Chun | |
| 10,431,188 B1 | 10/2019 | Nelson | |
| 10,692,484 B1 | 6/2020 | Merritt | |
| 10,699,695 B1 | 6/2020 | Nadolski | |
| 10,706,837 B1 | 7/2020 | Chicote | |
| 10,741,169 B1 | 8/2020 | Trueba | |
| 10,902,841 B2 | 1/2021 | Liu | |
| 10,911,596 B1 | 2/2021 | Do | |
| 11,017,761 B2 | 5/2021 | Peng | |
| 11,069,335 B2 | 7/2021 | Pollet | |
| 11,488,576 B2* | 11/2022 | Park | G06F 40/295 |
| 11,715,485 B2 | 8/2023 | Park | |
| 2002/0188449 A1* | 12/2002 | Nukaga | G10L 13/10 704/258 |
| 2004/0054537 A1 | 3/2004 | Morio | |
| 2007/0233472 A1* | 10/2007 | Sinder | G10L 21/00 704/219 |
| 2007/0298886 A1 | 12/2007 | Aguilar, Jr. | |
| 2015/0186359 A1* | 7/2015 | Fructuoso | G10L 25/30 704/8 |
| 2016/0093289 A1* | 3/2016 | Pollet | G10L 13/08 704/260 |
| 2016/0140951 A1* | 5/2016 | Agiomyrgiannakis | G10L 13/02 704/260 |
| 2017/0092259 A1* | 3/2017 | Jeon | G10L 13/047 |
| 2017/0110110 A1 | 4/2017 | Pollet | |
| 2018/0096677 A1 | 4/2018 | Pollet | |
| 2018/0268806 A1 | 9/2018 | Chun et al. | |
| 2019/0108830 A1 | 4/2019 | Pollet | |
| 2019/0189109 A1 | 6/2019 | Yuan | |
| 2020/0005764 A1* | 1/2020 | Chae | G10L 13/047 |
| 2020/0066253 A1 | 2/2020 | Peng | |
| 2020/0265829 A1 | 8/2020 | Liu | |
| 2020/0288014 A1 | 9/2020 | Huet | |
| 2021/0097976 A1 | 4/2021 | Chicote | |
| 2021/0151029 A1 | 5/2021 | Gururani | |
| 2021/0193112 A1 | 6/2021 | Cui | |
| 2022/0208170 A1 | 6/2022 | Gururani | |

OTHER PUBLICATIONS

Jia, Ye, et al. "Transfer Learning from Speaker Verification to Multispeaker Text-To-Speech Synthesis." arXiv preprint arXiv:1806.04558, Retrieved from https://arxiv.org/abs/1806.04558, dated 2018.

Polyak, Adam, et al. "TTS skins: Speaker conversion via ASR." arXiv preprint arXiv:1904.08983, Retrieved from https://arxiv.org/abs/1904.08983, dated 2019.

Sun, Lifa, et al. "Voice conversion using deep bidirectional long short-term memory based recurrent neural networks." 2015 IEEE international conference on acoustics, speech and signal processing (ICASSP). IEEE, 2015. , Retrieved from: https://www.researchgate.net/profile/Lifa_Sun/publication/280919021_Voice_Conversion_Using_Deep_Bidirectional_Long_Short-Term_Memory_based_Recurrent_Neural_Networks/links/55cb072808aeca747d69fd26.pdf 2015.

Kameoka, Hirokazu, et al. "StarGAN-VC: Non-parallel many-to-many voice conversion with star generative adversarial networks." arXiv preprint arXiv:1806.02169, Retrieved from https://arxiv.org/abs/1806.02169, dated 2018.

Liu, Li-Juan, et al. "WaveNet Vocoder with Limited Training Data for Voice Conversion." Interspeech, Retrieved from https://www.isca-speech.org/archive/Interspeech_2018/pdfs/1190.pdf, dated 2018.

Narayanan, Praveen, et al. "Hierarchical sequence to sequence voice conversion with limited data." arXiv preprint arXiv:1907.07769, Retrieved from https://arxiv.org/abs/1907.07769, dated 2019.

Zhang, Mingyang, et al. "Joint training framework for text-to-speech and voice conversion using multi-source tacotron and wavenet." arXiv preprint arXiv:1903.12389 , Retrieved from https://arxiv.org/abs/1903.12389, dated 2019.

Huang, Wen-Chin, et al. "Voice transformer network: Sequence-to-sequence voice conversion using transformer with text-to-speech pretraining." arXiv preprint arXiv:1912.06813, Retrieved from https://arxiv.org/abs/1912.06813, dated 2019.

Luong, Hieu-Thi, and Junichi Yamagishi. "Bootstrapping non-parallel voice conversion from speaker-adaptive text-to-speech." arXiv preprint arXiv:1909.06532, Retrieved from https://arxiv.org/abs/1909.06532, dated 2019.

Kim, Tae-Ho, et al. "Emotional Voice Conversion using multitask learning with Text-to-speech." arXiv preprint arXiv:1911.06149 Retrieved from: https://arxiv.org/abs/1911.06149, dated 2019.

Ren, Yi, et al. "FastSpeech 2: Fast and High-Quality End-to-End Text-to-Speech." arXiv preprint arXiv:2006.04558, Retrieved from: https://arxiv.org/abs/2006.04558, dated 2020.

Skerry-Ryan, R. J., et al. "Towards end-to-end prosody transfer for expressive speech synthesis with tacotron." arXiv preprint arXiv:1803.09047, Retrieved from: https://arxiv.org/abs/1803.09047, dated 2018.

Theune, Mariët, et al. "Generating expressive speech for storytelling applications." IEEE Transactions on Audio, Speech, and Language Processing 14.4: 1137-1144., Retrieved from: https://ieeexplore.ieee.org/abstract/document/1643643, dated 2006.

(56) References Cited

OTHER PUBLICATIONS

Gibiansky, Andrew, et al. "Deep voice 2: Multi-speaker neural text-to-speech." Advances in neural information processing systems, Retrieved from: http://papers.nips.cc/paper/6889-deep-voice-2-multi-speaker-neural-text-to-speech, dated 2017.

Shen, Jonathan, et al. "Natural tts synthesis by conditioning wavenet on mel spectrogram predictions." 2018 IEEE International Conference on Acoustics, Speech and Signal Processing (ICASSP). IEEE, Retrieved from: https://ieeexplore.ieee.org/abstract/document/8461368 2018.

Wu, Xixin, et al. "Rapid Style Adaptation Using Residual Error Embedding for Expressive Speech Synthesis." Interspeech, Retrieved from: http://www1.se.cuhk.edu.hk/~hccl/publications/pub/2018_201809_INTERSPEECH_XixinWU.pdf 2018.

Zen, Heiga, et al. "The HMM-based speech synthesis system (HTS) version 2.0." SSW., Retrieved from: https://www.cs.cmu.edu/afs/cs/Web/People/awb/papers/ssw6/ssw6_294.pdf, 6 pages, dated 2007.

Kalchbrenner, Nal, et al. "Efficient Neural Audio Synthesis." International Conference on Machine Learning, Retrieved from: http://proceedings.mlr.press/v80/kalchbrenner18a.html, dated 2018.

Eyben, Florian, et al. "Unsupervised clustering of emotion and voice styles for expressive TTS." 2012 IEEE International Conference on Acoustics, Speech and Signal Processing (ICASSP). IEEE, Retrieved from: https://ieeexplore.ieee.org/abstract/document/6288797, dated 2012.

Wang, Yuxuan, et al. "Tacotron: Towards end-to-end speech synthesis." arXiv preprint arXiv:1703.10135, Retrieved from: https://arxiv.org/abs/1703.10135, dated 2017.

Wang, Yuxuan, et al. "Style Tokens: Unsupervised Style Modeling, Control and Transfer in End-to-End Speech Synthesis." ICML., Retrieved from: https://openreview.net/forum?id=Hy4s90-OZr, dated 2018.

Akuzawa, Kei, Yusuke Iwasawa, and Yutaka Matsuo. "Expressive Speech Synthesis via Modeling Expressions with Variational Autoencoder." Proc. Interspeech 2018: 3067-3071, Retrieved from: https://www.isca-speech.org/archive/Interspeech_2018/abstracts/1113.html, dated 2018.

Taigman, Yaniv, et al. "VoiceLoop: Voice Fitting and Synthesis via a Phonological Loop." International Conference on Learning Representations, Retrieved from: https://openreview.net/forum?id=SkFAWax0-&noteId=SkFAWax0-, dated 2018.

Hsu, Wei-Ning, et al. "Hierarchical Generative Modeling for Controllable Speech Synthesis." International Conference on Learning Representations.Retrieved from: https://openreview.net/forum?id=rygkk305YQ, dated 2018.

Kenter, Tom, et al. "CHiVE: Varying prosody in speech synthesis with a linguistically driven dynamic hierarchical conditional variational network." International Conference on Machine Learning, Retrieved from: http://proceedings.mlr.press/v97/kenter19a.html, dated 2019.

Lee, Younggun, and Taesu Kim. "Robust and fine-grained prosody control of end-to-end speech synthesis." ICASSP 2019-2019 IEEE International Conference on Acoustics, Speech and Signal Processing (ICASSP). IEEE, Retrieved from: https://ieeexplore.ieee.org/abstract/document/8683501, dated 2019.

Klimkov, Viacheslav, et al. "Fine-Grained Robust Prosody Transfer for Single-Speaker Neural Text-To-Speech." Proc. Interspeech 2019: 4440-4444, Retrieved from: https://www.isca-speech.org/archive/Interspeech_2019/abstracts/2571.html, dated 2019.

Daniel, Povey, et al. "The Kaldi speech recognition toolkit." IEEE 2011 workshop on automatic speech recognition and understanding. No. EPFL-CONF-192584. Retrieved from: https://www.fit.vut.cz/research/product/304/, dated 2011.

Ghahremani, Pegah, et al. "A pitch extraction algorithm tuned for automatic speech recognition." 2014 IEEE international conference on acoustics, speech and signal processing (ICASSP). IEEE, Retrieved from: https://ieeexplore.ieee.org/abstract/document/6854049, dated 2014.

\* cited by examiner

GENERATING EXPRESSIVE SPEECH AUDIO FROM TEXT DATA

BACKGROUND

Text-to-speech systems are systems that emulate human speech by processing text and outputting a synthesized utterance of the text. However, conventional text to speech systems may produce unrealistic, artificial sounding speech output and also may not capture the wide variation of human speech. Techniques have been developed to produce more expressive text-to-speech systems, however many of these systems do not enable fine-grained control of the expressivity by a user. In addition, many systems for expressive text-to-speech use large, complex models requiring a significant number of training examples and/or high-dimensional features for training.

SUMMARY

In accordance with a first aspect, this specification describes a system for use in video game development to generate expressive speech audio. The system comprises a user interface configured to receive user-input text data and a user selection of a speech style. The system further comprises a machine-learned synthesizer comprising a text encoder, a speech style encoder and a decoder. The machine-learned synthesizer is configured to: generate one or more text encodings derived from the user-input text data, using the text encoder of the machine-learned synthesizer; generate a speech style encoding by processing a set of speech style features associated with the selected speech style using the speech style encoder of the machine-learned synthesizer; combine the one or more text encodings and the speech style encoding to generate one or more combined encodings; and decode the one or more combined encodings with the decoder of the machine-learned synthesizer to generate predicted acoustic features. The system further comprises one or more modules configured to process the predicted acoustic features, the one or more modules comprising: a machine-learned vocoder configured to generate a waveform of the expressive speech audio.

In accordance with a second aspect, this specification describes a computer-implemented method for generating acoustic features from text data using a machine-learned synthesizer. The method comprises: receiving the text data and a set of speech style features, wherein the set of speech style features comprise one or more statistical features; generating one or more text encodings derived from the text data using a text encoder of the machine-learned synthesizer; generating a speech style encoding, comprising processing the set of speech style features with a speech style encoder of the machine-learned synthesizer; combining the one or more text encodings and the speech style encoding to generate one or more combined encodings; and generating the acoustic features, comprising decoding the one or more combined encodings using a decoder of the machine-learned synthesizer.

In accordance with a third aspect, this specification describes a computer readable medium storing instructions, which when executed by a processor, cause the processor to: receive text data and a set of speech style features, wherein the speech style features comprise one or more statistical features; generate one or more text encodings derived from the text data, using a text encoder of a machine-learned synthesizer; generate a speech style encoding, comprising processing the set of speech style features with a speech style encoder of the machine-learned synthesizer; combine the one or more text encodings and the speech style encoding to generate one or more combined encodings; and decode the one or more combined encodings with a decoder of the machine-learned synthesizer to generate predicted acoustic features for use in generating a waveform comprising expressive speech audio.

BRIEF DESCRIPTION OF THE DRAWINGS

Certain embodiments of the present invention will now be described, by way of example, with reference to the following figures.

DETAILED DESCRIPTION

Figure 1:
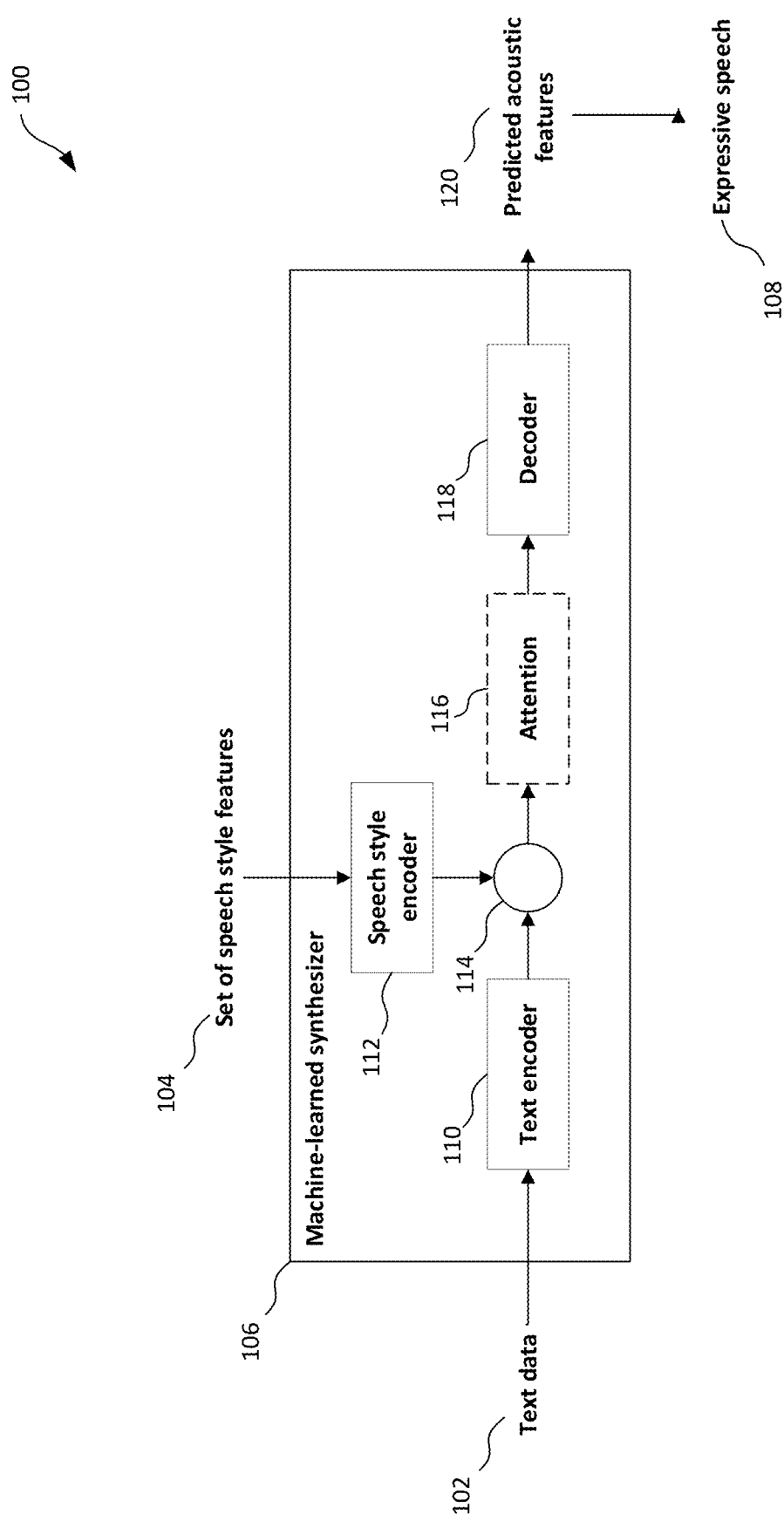
FIG. 1 shows an example system for generating expressive speech audio data from text data and a set of speech style features, using a machine-learned synthesizer.

Example implementations provide system(s) and methods for generating expressive speech audio data from text data and a set of speech style features. The described systems and methods are particularly advantageous in the context of video game development. Video games often include multiple characters, with a character speaking in different styles for different scenes. As a result, it is desirable to provide a system where synthesized speech from multiple speaker identities can be generated for different characters, while being able to control the performance of a character's speech depending on the scene. Example systems described in this specification allow video game developers and/or content creators to generate realistic expressive speech in a desired speaker's voice using machine learning and digital signal processing. In addition, in some examples, system modules described herein may also be used by others (e.g., players of a video game) to generate speech content.

Systems described in this specification allow a user to control the exact speech content (with linguistic features such as words, pronunciations, and syntactic parse trees) in any language, the voice (speaker identity and characteristics), and the overall performance/prosody (e.g. tone, intonation, and emotion). The system also allows the user to perform fine-grained modifications on the speech (e.g. speaking rate, pause durations, and volume) as well as add non-speech acoustics such as special effects, ambient sounds, and music backgrounds. Users of the system may input text and vary the style of the speech output using a machine-learned synthesizer. This may involve varying attributes of the speaker (e.g. changing age, gender, accent type, prosody) while still achieving a natural sounding speech output.

In some implementations, users may input reference speech audio data to transfer elements of a speaker's speaking style when generating synthesized speech from text data. Existing approaches for transferring speech style from reference speech audio data often use high-dimensional representations of the audio data (e.g. spectrogram data) to determine speech style features. As a result, it is usually necessary to use large, complex models in existing expressive text-to-speech systems in order to identify relevant features in the high-dimensional representation and achieve natural sounding speech output.

In contrast, methods and systems as described in this specification may use low-dimensional representations of the reference speech audio to determine speech style features. For example, the reference speech audio data may first be converted into one or more one-dimensional time series data to then determine global statistics of the reference speech audio data. By using a low-dimensional representation of the reference speech audio, smaller models can be used to provide expressive text to speech systems. In addition, by being trained using low-dimensional representations, models described in this specification can better disentangle between different aspects of speech style, thus providing a user with more control when generating expressive speech from text.

Systems described in this specification include one or more modules to process output of the machine-learned synthesizer. The modules allow the user of the system to modify various attributes of the synthesized speech output in addition to the speech style. For example, the modules may include at least one of a special effects module, a vocoder module, and a mastering module. Some of these modules may be machine-learned and trained based on outputs of a preceding module in the system. By using machine-learning in one or more of the modules, each module may correct for artifacts in the output of preceding modules and thus achieve more natural sounding speech output.

Methods and systems for generating expressive speech audio data from text data as described in this specification may be more computationally efficient than previous approaches to generating expressive speech. As a result, methods and systems as described in this specification can be implemented on a wider range of devices of varying computational resources. In addition, models described in this specification may have a smaller number of parameters than models used in existing expressive text to speech systems, requiring less storage space when storing the model.

FIG. 1 shows an example system 100 for generating expressive speech audio 108 data from text data 102 and a set of speech style features 104 using a machine-learned synthesizer 106. The machine-learned synthesizer 106 comprises a text encoder 110, a speech style encoder 112, a combining operation 114, and a text decoder 118. The machine-learned synthesizer 106 is configured to output predicted acoustic features 120. Expressive speech audio may be generated using the predicted acoustic features 120 output by the machine-learned synthesizer, for example using one or more additional modules. Additionally or alternatively, the predicted acoustic features may be stored for use in subsequent processing. In some implementations, the machine-learned synthesizer 106 may further comprise an attention mechanism 116.

The text data 102 may be any digital data representing text. For example, the text data 102 may be encoded by a sequence of character vectors with each vector representing a character of the text data 102. The elements of a character vector may correspond with one character out of a set of possible characters, with each character represented by a character vector with only one non-zero element. Additionally or alternatively, the text data 102 may comprise continuous embeddings, e.g. character embeddings and/or word embeddings. Generally, embeddings are vectors of a learned embedding space. The text data 102 may be based on input from a user or otherwise determined. Phoneme information may also be included in the text data 102, which may be determined or specified by the user.

The set of speech style features 104 may be any set of features representing aspects of speech style. For example, the set of speech style features 104 may comprise prosodic features and/or speaker attribute information. Prosodic features are features which capture aspects of speech prosody such as intonation, stress, rhythm, and style of speech. Speaker attribute information is information that captures characteristics of the desired speaker in the synthesized output. For example, speaker attribute information may comprise at least one of an age, a gender, and an accent type.

The set of speech style features 104 comprises one or more statistical features. Statistical features are global statistics that capture aspects of speech styles. For example, one or more prosodic features may be statistical features.

In some implementations, statistical features may be determined from an instance of speech audio data (or reference speech audio data). The reference speech audio data may first be converted into one or more one-dimensional time series data. The statistical features may be determined from the one or more one-dimensional time series.

The one or more one-dimensional time series data may comprise at least one of a volume contour and a pitch contour. Volume (i.e. loudness) may be represented as the root mean square (RMS) of overlapping frames of audio. For fundamental frequency, a normalized cross-correlation function may be used to compute the pitch contour. The time-series may be a smoothed value of fundamental frequency for each audio frame. Unvoiced frames may be set to 0 in the pitch contour based on a threshold on the RMS. Given log fundamental frequency contours and RMS contours, statistical features may be computed by extracting "global statistics" (mean, variance, maximum, minimum) over each of the two time-series. The one or more statistical features may comprise: a mean, a variance, a maximum and a minimum of the pitch contour; and a mean, a variance, and a maximum of the volume contour. Additionally or alternatively, statistical features may comprise features derived from timing information. For example, statistical features may be determined from phoneme duration information and/or pause duration information.

Using low-dimensional speech style features, such as statistical features, may allow for more control of various speech style attributes when synthesizing expressive speech. For example, prosody features may be better disentangled from other features, such as those derived from text data and/or speaker attribute information. In addition, processing statistical features may use fewer computational resources and/or be processed faster than high dimensional features, such as spectrogram data. Statistical features may also require less storage space than other types of speech style features. In implementations where the speech style features are transmitted via a network, transmitting statistical features may also use fewer network resources and consume less network bandwidth.

The text data 102 is processed by a text encoder 110 of the machine-learned synthesizer 106 to generate one or more text encodings. The text encoder 110 may comprise neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers. The one or more text encodings output by the text encoder 110 is a learned representation of the text data 102, enabling the output of synthesized speech 108 corresponding to the text data 102.

The set of speech style features 104 is processed by a speech style encoder 112 of the machine-learned synthesizer 106 to generate a speech style encoding. The speech style encoder 112 may comprise neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers. The speech style encoding output by the speech style encoder 112 is a learned representation of the speech style features 104, enabling the output of synthesized speech 108 in a style corresponding to the speech style features 104.

In some implementations, the speech style encoder 112 is a speech style encoder 112 configured to apply a single learned linear projection (or transformation) to the speech style features 104 to generate the speech style encoding. A linear speech style encoder 112 may use fewer computational resources and/or process the speech style features 104 faster than other types of speech style encoder. A machine-learned synthesizer 106 comprising a linear speech style encoder 112 may also require less storage space than other machine-learned synthesizers. In addition, training a machine-learned synthesizer 106 comprising a linear speech style encoder 112 may require few training examples and/or less complex speech style features 104, while still enabling the synthesis of expressive speech 108 from text data 102.

The one or more text encodings and the speech style encodings are combined to generate one or more combined encodings. The combining operation 114 may comprise any binary operation resulting in a single encoding. For example, the combination may be performed by an addition, an averaging, a dot product, or a Hadamard product. The speech style encoder 112 may be configured to produce a vector output having dimension(s) adapted for combination, during the combining operation 114, with the vector output of the text encoder 110. For example in some embodiments the text encoder 110 and the speech style encoder 114 may generate vector outputs of the same dimension, which may be combined by a suitable binary operation such as addition. The combined encoding output by the combining operation 114 is a learned representation of both the text data 102 and the set of speech style features 104 enabling the output of synthesized speech 108 corresponding to the text data 102 in a style corresponding to the set of speech style features 104.

Predicted acoustic features 120 are generated from processing the combined output. The generating comprises decoding the one or more combined encodings by a decoder 118 of the machine-learned synthesizer 106 to generate predicted acoustic features 120. The decoder 118 may comprise neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers.

Acoustic features may comprise any low-level acoustic representation of frequency, magnitude and phase information such as linear spectrograms, log-mel-spectrograms, linear predictive coding (LPC) coefficients etc. Hence, in various examples, the synthesizer predicts a compressed representation of the final waveform, such that the acoustic features may in various cases be referred to as compressed acoustic features, acoustic feature frames or intermediate acoustic features. The acoustic features may comprise a sequence of vectors, each vector representing acoustic information in a short time period, e.g. 50 milliseconds. Acoustic features may comprise log-mel spectrograms, Mel-Frequency Cepstral Coefficients (MFCC), log fundamental frequency (LFO), band aperiodicity (bap) or combinations thereof.

In some examples, the acoustic features may comprise spectrogram parameters. Spectrogram parameters 120 are any parameters used when representing a spectrogram. The spectrogram parameters may be linear spectrogram magnitudes or log-transformed mel-spectrogram magnitudes for a plurality of frequencies.

Figure 2:
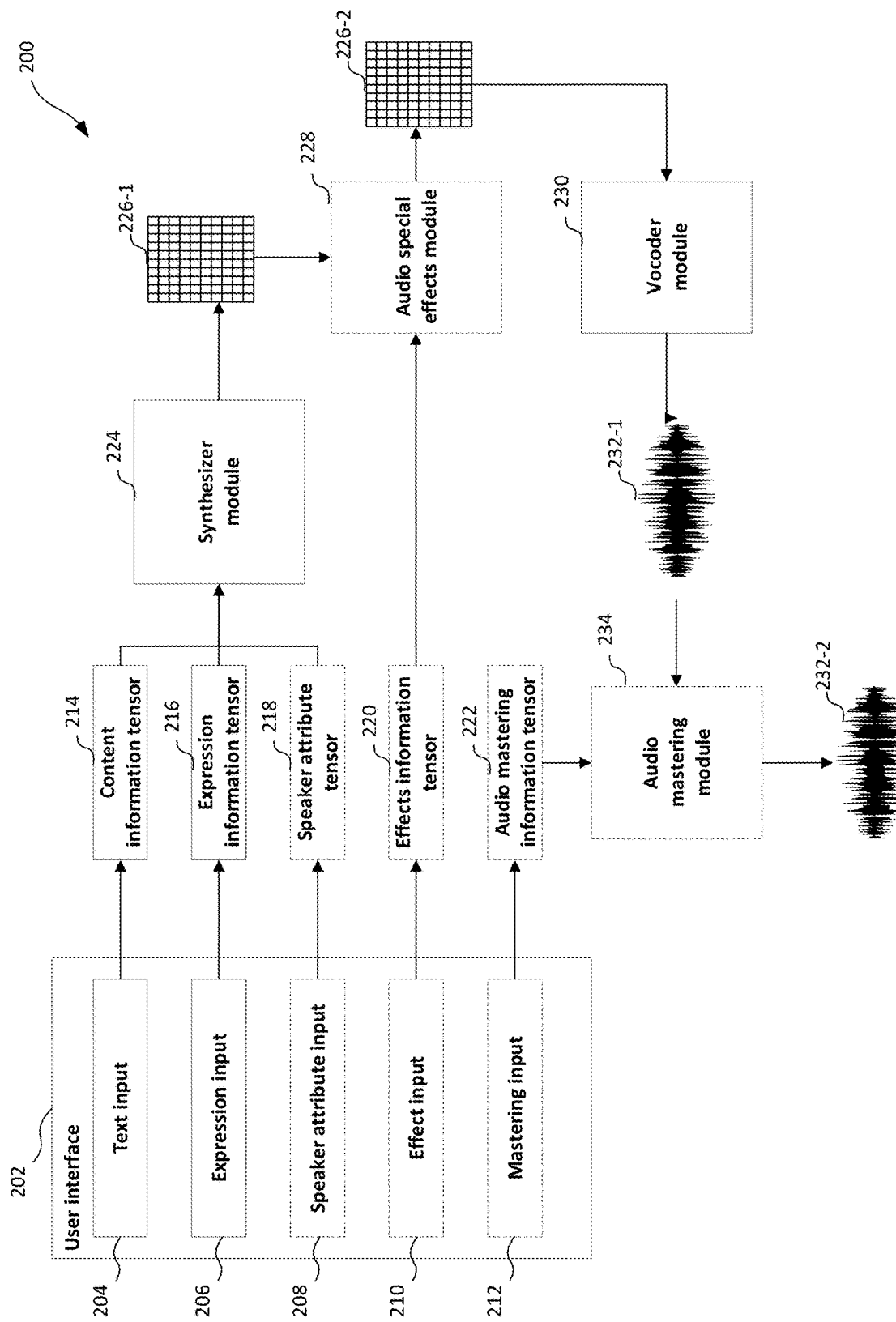
FIG. 2 shows an example system of generating expressive speech audio data from text data and a set of speech style features using a machine-learned synthesizer and a machine-learned vocoder.

The waveform of expressive speech audio 108 may be generated using the predicted acoustic features 120 output by the machine-learned synthesizer 106, for example using one or more additional modules. FIG. 2 provides an example of using a machine-learned vocoder to generate expressive speech audio 108 from acoustic features 120.

In some implementations, the machine-learned synthesizer 106 further comprises an attention mechanism 116.

In these implementations, the text encoder 110 outputs a plurality of text encodings, with a text encoding for each input time step of the text data 102, and the decoder 118 outputs predicted acoustic features 120 for each output time step of a plurality of output time steps. For example, the text encoder 110 may process the text data 102 at the character level to generate a text encoding for each character of the text data 102, and the decoder 118 may output acoustic features corresponding to frames of the expressive speech audio data 108. The combining operation 114 combines the speech style encoding with each of the text encodings to generate a plurality of combined encodings. At each output time step, the plurality of combined encodings are received by the attention mechanism 116 to generate attention weights for each of the combined encodings and averages each combined encoding by the respective attention weight to generate a context vector. When decoding to produce predicted acoustic features for an output time step, the decoder 118 decodes the context vector for the output time step.

The machine-learned synthesizer 106 is trained to generate predicted acoustic features 120 using training data comprising a plurality of training examples. Each training example includes speech audio data and text data for the corresponding speech. Speech style features may be determined from the speech audio data. For example, statistical features may be determined from the speech audio data as described above. Additionally, the training examples may include annotations of speech style features, such as speaker attribute information. The speech audio data of each training example is also processed to generate ground truth acoustic features.

During training, the synthesizer processes each training example to produce predicted acoustic features and its parameters are updated based on a comparison between predicted acoustic features and ground truth acoustic features. The parameters of the synthesizer may be updated by optimizing an objective function and any suitable optimization procedure. For example, the objective function may be optimized using gradient-based methods such as stochastic gradient descent, mini-batch gradient descent, or batch gradient descent. In implementations where batch gradient descent is used to train the synthesizer, a learning rate of 0.001, batch size of 32, and training for approximately 200,000 steps may be preferable.

As described above, the synthesizer may require fewer parameters than other models for generating expressive speech audio data. With fewer parameters, fewer training examples may be required to train the synthesizer. Additionally, training examples may be processed more quickly, leading to faster training of the synthesizer.

FIG. 2 shows an example system 200 for use in video game development to generate expressive speech audio data 232 from text data 204 and a set of speech style features 216. The system allows fine-grained and separate control of the primary inputs needed for the synthesis of dramatic speech (e.g. text, speaker information, style information).

As shown in FIG. 2 the system 200 includes a user interface configured to receive user text input 204 and expression input 206 which are processed by the system 200 to generate a content information tensor 214 and an expression information tensor 216. The text data processed by the machine-learned synthesizer 224 comprises the content information tensor 214, and the set of speech style features comprises the expression information tensor 216. The user interface 202 may also be configured to receive a user speaker attribute input 208 which is processed by the system to generate a speaker attribute tensor 218, with the set of speech style features further comprising the speaker attribute tensor 218. The set of speech style features may either be manually specified by a user or the user may sample these from an existing set of such feature sets output by a separate system incorporating prior datasets. Additionally or alternatively, the set of speech style features may be determined from a user input of speech audio data using one or more additional modules, such as a prosody analyzer and/or a speaker attribute analyzer.

For example, a prosody analyzer may determine statistical features from an instance of speech audio data (or reference speech audio data). The reference speech audio data may first be converted into one or more one-dimensional time series data. The statistical features may be determined from the one or more one-dimensional time series.

The one or more one-dimensional time series data may comprise at least one of a volume contour and a pitch contour. Volume (i.e. loudness) may be represented as the root mean square (RMS) of overlapping frames of audio. For fundamental frequency, a normalized cross-correlation function may be used to compute the pitch contour. The time-series may be a smoothed value of fundamental frequency for each audio frame. Unvoiced frames may be set to 0 in the pitch contour based on a threshold on the RMS. Given log fundamental frequency contours and RMS contours, statistical features may be computed by extracting "global statistics" (mean, variance, maximum, minimum) over each of the two time-series. The one or more statistical features may comprise: a mean, a variance, a maximum and a minimum of the pitch contour; and a mean, a variance, and a maximum of the volume contour. Additionally or alternatively, statistical features may comprise features derived from timing information. For example, statistical features may be determined from phoneme duration information and/or pause duration information.

The machine-learned synthesizer 224 is configured to process the text data and the set of speech style features to produce predicted acoustic features 226-1 in the manner described above with reference to FIG. 1.

The machine-learned vocoder 230 is used during processing of the predicted acoustic features 226-2 to produce a waveform 232-1 of expressive speech audio data. The expressive speech audio data is synthesized speech corresponding to the text input 204 in a speech style corresponding to the expression input 206, and optionally, spoken by a speaker with speaker attribute information 208. In embodiments where the system 200 includes an audio special effects module 228, the machine-learned vocoder 230 may output a waveform 232-1 of expressive speech audio with one or more effects corresponding to an effect input 210 applied. The machine-learned vocoder module 230 may comprise neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers.

The machine-learned vocoder 230 is trained using training data comprising a plurality of training examples. Each training example includes acoustic features and a corresponding ground truth waveform of speech audio. The acoustic features may be determined from the speech audio or otherwise provided. In embodiments where the system 200 includes a special effects module 228, one or more training examples may comprise ground truth waveforms of speech audio with one or more effects (e.g. with filtering, additional paralinguistic information such as yawns and laughs, and/or added environmental noise), with corresponding acoustic features.

During training, the vocoder processes the acoustic features of training examples to produce predicted waveforms and its parameters are updated based on a comparison between predicted waveforms and ground truth waveforms. The parameters of the vocoder may be updated by optimizing an objective function and any suitable optimization procedure. For example, the objective function may be optimized using gradient-based methods such as stochastic gradient descent, mini-batch gradient descent, or batch gradient descent. The machine-learned vocoder 230 may be trained separately to the machine-learned synthesizer 224, or jointly (e.g. with a single objective function to train both modules).

In this way, the machine-learned vocoder 230 may correct for audio artifacts that may be present in the outputs of the machine-learned synthesizer 224 and/or audio special effects module 228.

The user interface 202 may further be configured to receive user effect input 210, which is processed by the system 200 to generate an effects information tensor 220. The effect input 210 comprises information about desired modifications to the synthesized speech output. For example, this may include audio filtering, paralinguistic information such as yawns and screams, and environment sounds such as thunder, wind, and traffic noise. The system may also further comprise an audio special effects module 228 configured to receive predicted acoustic features 226-1 produced by the machine-learned synthesizer module 224 and the effects information tensor 220 to generate modified acoustic features 226-2. The modified acoustic features 226-2 are a representation of expressive speech audio with the desired effects applied. Additionally or alternatively, the audio special effects module 228 may be configured to receive and apply effects to a waveform of expressive speech audio data.

The audio special effects module 228 may be machine-learned. For example, the audio special effects module may comprise neural network layers. The neural network layers may comprise feedforward layers, e.g. fully connected layers and/or convolutional layers. Additionally or alternatively, the neural network layers may comprise recurrent layers, e.g. LSTM layers and/or bidirectional LSTM layers.

Additionally or alternatively, the audio special effects module 228 may be configured to apply determined audio transformations.

The audio special effects module 228, or components therein, may be trained using training data comprising a plurality of training examples. In embodiments where the audio special effects module 228 generates modified acoustic features 226-2 from predicted acoustic features 226-1, the audio special effects module 228 may be trained using training examples of speech audio data with and without one or more selected effects applied.

For example, each training example may include initial acoustic features of speech audio, an indication of one or more effects to be applied, and ground truth modified acoustic features of the speech audio with the one or more effects applied. The initial acoustic features and ground truth modified acoustic features may be determined from speech audio or otherwise provided.

During training, the special effects module 228 processes the initial acoustic features and the indication of one or more effects to be applied of training examples to produce predicted modified acoustic features and its parameters are updated based on a comparison between predicted modified acoustic features and ground truth modified acoustic features. The parameters of the special effects module 228 may be updated by optimizing an objective function and any suitable optimization procedure. For example, the objective function may be optimized using gradient-based methods such as stochastic gradient descent, mini-batch gradient descent, or batch gradient descent.

By using machine-learning in a plurality of the modules of the system 200, each module may correct for artifacts in the output of preceding modules and thus achieve more natural sounding speech output.

The user interface 202 may further be configured to receive user mastering input 212, which is processed by the system 200 to generate an audio mastering information tensor 222. The mastering input 212 comprises information about mastering transformations to be applied to the expressive synthesized speech. This may include adjustments to low-level acoustic information such as sample rate, bit depth, audio format and volume level with techniques such as compression, denoising, and silence removal. The system may also comprise an audio mastering module 234 configured to receive the waveform 232-1 produced by the machine-learned vocoder module 230 and the audio mastering information tensor 222 to generate a waveform 232-2 of expressive speech audio data with the mastering transformations applied.

Figure 3:
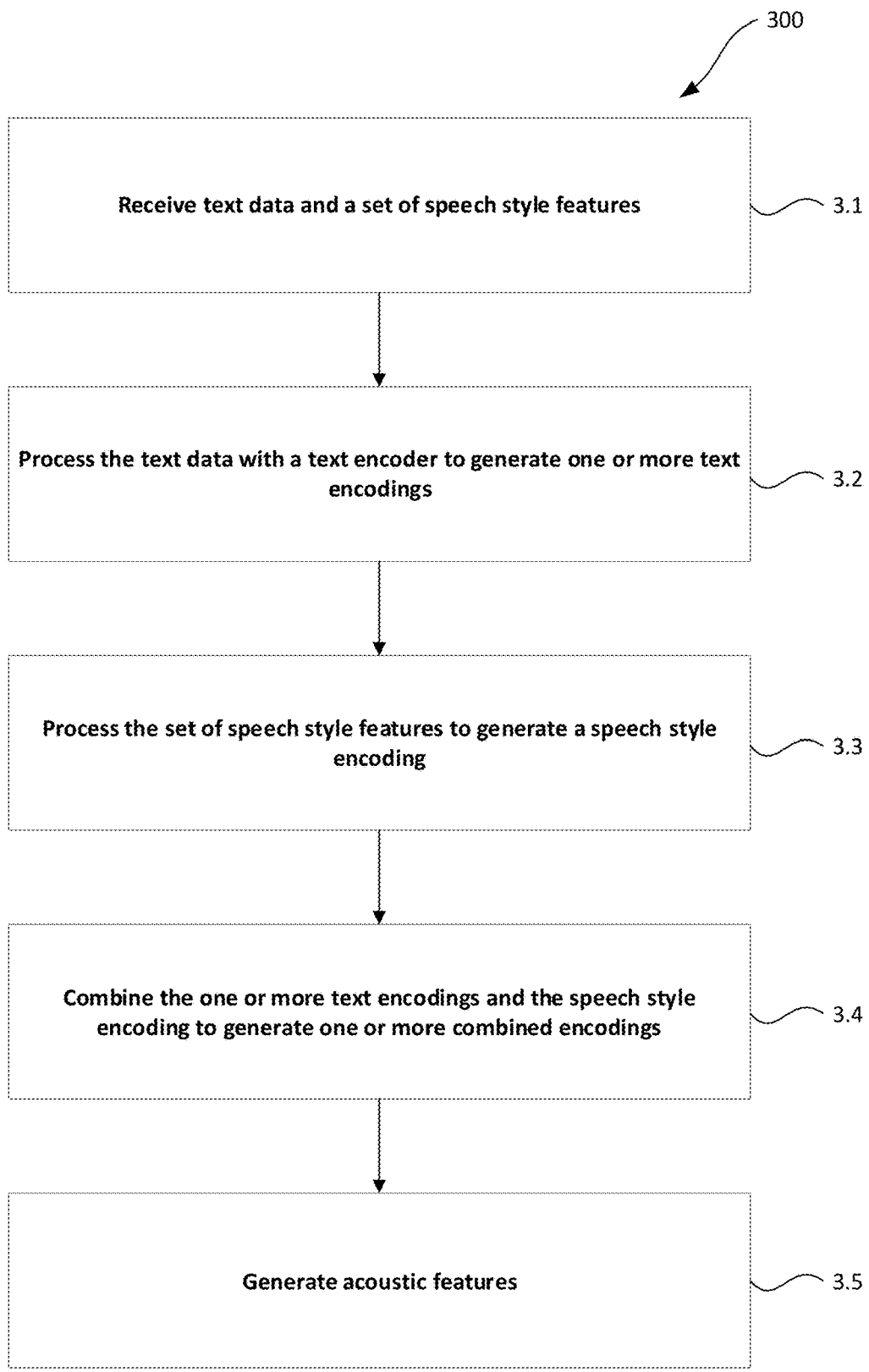
FIG. 3 is a flow diagram of an example method for generating acoustic features from text data and a set of speech style features using a machine-learned synthesizer.

FIG. 3 is a flow diagram 300 of an example method for generating acoustic features from text data and a set of speech style features using a machine-learned synthesizer.

In step 3.1, text data and a set of speech style features is received.

The text data may be any digital data representing text. For example, the text data may be encoded by a sequence of character vectors with each vector representing a character of the text data. The elements of a character vector may correspond with one character out of a set of possible characters, with each character represented by a character vector with only one non-zero element. Additionally or alternatively, the text data may comprise continuous embeddings, e.g. character embeddings and/or word embeddings. Generally, embeddings are vectors of a learned embedding space. The text data may be based on input from a user or otherwise determined. Phoneme information may also be included in the text data, which may be determined or specified by the user.

The set of speech style features may be any set of features representing aspects of speech style. For example, the set of speech style features may comprise prosodic features and/or speaker attribute information. Prosodic features are features which capture aspects of speech prosody such as intonation, stress, rhythm, and style of speech. Speaker attribute information is information that captures characteristics of the desired speaker in the synthesized output. For example, speaker attribute information may comprise at least one of an age, a gender, and an accent type.

The set of speech style features may comprise one or more statistical features. Statistical features are global statistics that capture aspects of speech styles. For example, one or more prosodic features may be statistical features. In some implementations, statistical features may be determined from an instance of speech audio data (or reference speech audio data). In these implementations, the reference speech audio data may first be converted into one or more one-dimensional time series data. The statistical features may be determined from the one or more one-dimensional time series. For example, the one or more one-dimensional time series data may comprise at least one of a pitch contour and a volume contour, and statistics may be determined from these contours.

Using low-dimensional speech style features, such as statistical features, may allow for more control of various speech style attributes when synthesizing expressive speech. For example, prosody features may be better disentangled from other features, such as those derived from text data and/or speaker attribute information. In addition, processing statistical features may use fewer computational resources and/or be processed faster than high dimensional features, such as spectrogram data. Statistical features may also require less storage space than other types of speech style features. In implementations where the speech style features are transmitted via a network, transmitting statistical features may also use fewer network resources and consume less network bandwidth.

In step 3.2, the text data is processed by a text encoder of the machine-learned synthesizer to generate one or more text encodings. The text encoder may comprise neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers. The text encoding is a learned representation of the text data, enabling the output of synthesized speech corresponding to the text data.

In step 3.3, the set of speech style features is processed by a speech style encoder of the machine-learned synthesizer to generate a speech style encoding. The speech style encoder may comprise neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers. The speech style encoding is a learned representation of the speech style features, enabling the output of synthesized speech corresponding to the speech style features.

In some implementations, the speech style encoder is a speech style encoder configured to apply a single learned linear projection (or transformation) to the speech style features to generate the speech style encoding. A linear speech style encoder may use fewer computational resources and/or process the speech style features faster than other types of speech style encoders. The linear speech style encoder may also require less storage space than other methods of encoding speech style features. In addition, training a machine-learned synthesizer comprising a linear speech style encoder may require few training examples and/or less complex speech style features, while still enabling the synthesis of expressive speech from text data.

In step 3.4, the one or more text encodings and the speech style encodings are combined to generate one or more combined encodings. The combining may comprise any binary operation resulting in a single encoding. For example, the combination may be performed by an addition, an averaging, a dot product, or a Hadamard product. The combined encoding is a learned representation of both the text data and the set of speech style features enabling the output of synthesized speech corresponding to the text data in a style corresponding to the set of speech style features.

In step 3.5, acoustic features are generated. The generating comprises decoding the one or more combined encodings by a decoder of the machine-learned synthesizer to generate predicted acoustic features. The decoder may comprise neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers.

Acoustic features may comprise any low-level acoustic representation of frequency, magnitude and phase information. The acoustic features may comprise spectrogram parameters. Spectrogram parameters are any parameters used when representing a spectrogram. For example, spectrogram parameters may be linear spectrogram magnitudes or log-transformed mel-spectrogram magnitudes for a plurality of frequencies. Additionally or alternatively, the acoustic features may comprise LPC coefficients.

The generated acoustic features may be used to generate expressive speech audio data. For example, one or more additional modules, e.g. comprising the machine-learned vocoder module shown in FIG. 2, may be used to generate a waveform comprising the expressive speech audio data, using the generated acoustic features. In some examples, production of expressive speech audio data may be carried out in subsequent processing, i.e. the acoustic features generated by the machine-learned synthesizer may be stored, for later production of speech audio data.

Figure 4:
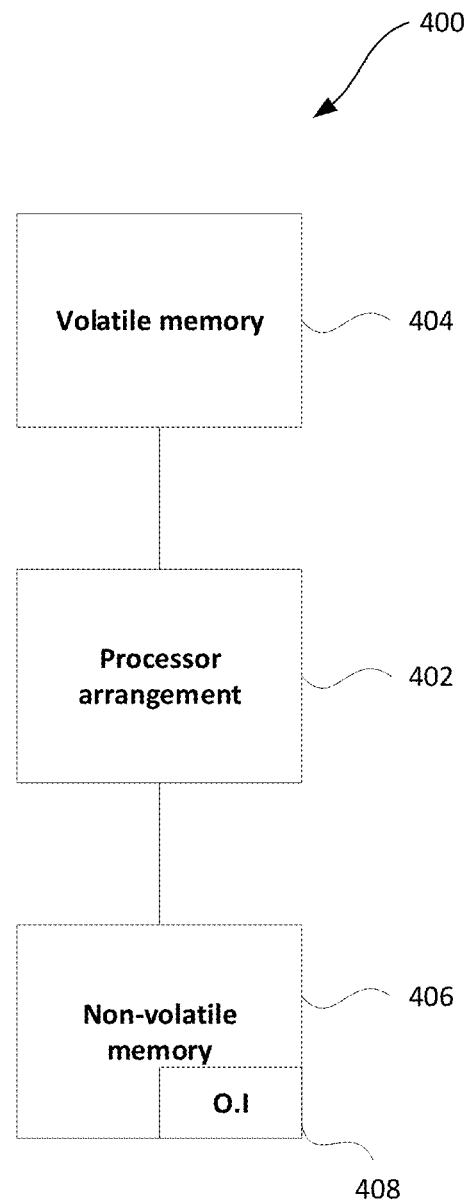
FIG. 4 shows a schematic example of a system/apparatus for performing any of the methods described herein.

FIG. 4 shows a schematic example of a system/apparatus for performing any of the methods described herein. The system/apparatus shown is an example of a computing device. It will be appreciated by the skilled person that other types of computing devices/systems may alternatively be used to implement the methods described herein, such as a distributed computing system.

The apparatus (or system) 400 comprises one or more processors 402. The one or more processors control operation of other components of the system/apparatus 400. The one or more processors 402 may, for example, comprise a general purpose processor. The one or more processors 402 may be a single core device or a multiple core device. The one or more processors 402 may comprise a central processing unit (CPU) or a graphical processing unit (GPU). Alternatively, the one or more processors 402 may comprise specialized processing hardware, for instance a RISC processor or programmable hardware with embedded firmware. Multiple processors may be included.

The system/apparatus comprises a working or volatile memory 404. The one or more processors may access the volatile memory 404 in order to process data and may control the storage of data in memory. The volatile memory 404 may comprise RAM of any type, for example Static RAM (SRAM), Dynamic RAM (DRAM), or it may comprise Flash memory, such as an SD-Card.

The system/apparatus comprises a non-volatile memory 406. The non-volatile memory 406 stores a set of operation instructions 408 for controlling the operation of the processors 402 in the form of computer readable instructions. The non-volatile memory 406 may be a memory of any kind such as a Read Only Memory (ROM), a Flash memory or a magnetic drive memory.

The one or more processors 402 are configured to execute operating instructions 408 to cause the system/apparatus to perform any of the methods described herein. The operating instructions 408 may comprise code (i.e. drivers) relating to the hardware components of the system/apparatus 400, as well as code relating to the basic operation of the system/apparatus 400. Generally speaking, the one or more processors 402 execute one or more instructions of the operating instructions 408, which are stored permanently or semi-permanently in the non-volatile memory 406, using the volatile memory 404 to temporarily store data generated during execution of said operating instructions 408.

Implementations of the methods described herein may be realized as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 4, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

What is claimed is:

1. A system for use in video game development for generating a speech audio waveform, the system comprising:
   a user interface configured to receive user-input text data and a user selection of a speech style; and
   a machine-learned synthesizer comprising a text encoder, a speech style encoder and a decoder, the machine-learned synthesizer being configured to:

generate one or more text encodings derived from the user-input text data, using the text encoder of the machine-learned synthesizer;

generate a speech style encoding by processing a set of speech style features associated with the selected speech style using the speech style encoder of the machine-learned synthesizer;

combine the one or more text encodings and the speech style encoding to generate one or more combined encodings; and decode the one or more combined encodings with the decoder of the machine-learned synthesizer to generate a compressed representation of a speech audio waveform.

2. The system of claim 1, wherein the compressed representation comprises a sequence of vectors, each vector representing acoustic information for a respective time period.

3. The system of claim 1, wherein the compressed representation comprises one or a combination of a log-mel spectrogram representation, a Mel-Frequency Cepstral Coefficients (MFCC) representation, a log fundamental frequency (LFO) representation, or a band aperiodicity (bap) representation.

4. The system of claim 1, wherein the compressed representation comprises spectrogram magnitudes.

5. The system of claim 4, wherein the spectrogram magnitudes comprise linear spectrogram magnitudes or log-transformed mel-spectrogram magnitudes.

6. The system of claim 1, wherein the set of speech style features comprises prosodic features determined from the selected speech style.

7. The system of claim 1, wherein the compressed representation comprises a representation of one or more of frequency, magnitude or phase.

8. The system of claim 1, wherein:
the user interface is further configured to receive a user selection of an instance of speech audio; and
the system further comprises a prosody analyzer configured to process the selected instance of speech audio to determine the prosodic features.

9. The system of claim 1, wherein:
the user interface is further configured to receive a user selection of speaker attribute information; and
the set of speech style features further comprises the speaker attribute information.

10. The system of claim 1 further comprising a machine-learned vocoder configured to generate the speech audio waveform.

11. A computer-implemented method comprising:
receiving user-input text data and a user selection of a speech style;
generating one or more text encodings derived from the user-input text data, using a text encoder of a machine-learned synthesizer;
generating a speech style encoding by processing a set of speech style features associated with the selected speech style using a speech style encoder of the machine-learned synthesizer;
combining one or more text encodings and the speech style encoding to generate one or more combined encodings; and
decoding the one or more combined encodings with a decoder of the machine-learned synthesizer to generate a compressed representation of a speech audio waveform.

12. The method of claim 11, wherein the compressed representation comprises a sequence of vectors, each vector representing acoustic information for a respective time period.

13. The method of claim 11, wherein the compressed representation comprises one or a combination of a log-mel spectrogram representation, a Mel-Frequency Cepstral Coefficients (MFCC) representation, a log fundamental frequency (LFO) representation, or a band aperiodicity (bap) representation.

14. The method of claim 11, wherein the compressed representation comprises linear spectrogram magnitudes or log-transformed mel-spectrogram magnitudes.

15. The method of claim 11, wherein the compressed representation comprises a representation of one or more of frequency, magnitude or phase.

16. A non-transitory computer readable medium storing instructions, which when executed by one or more processors, cause one or more of the processors to:
receive user-input text data and a user selection of a speech style;
generate one or more text encodings derived from the user-input text data, using a text encoder of a machine-learned synthesizer;
generate a speech style encoding by processing a set of speech style features associated with the selected speech style using a speech style encoder of the machine-learned synthesizer;
combine one or more text encodings and the speech style encoding to generate one or more combined encodings; and
decode the one or more combined encodings with a decoder of the machine-learned synthesizer to generate a compressed representation of a speech audio waveform.

17. The non-transitory computer readable medium of claim 16, wherein the compressed representation comprises a sequence of vectors, each vector representing acoustic information for a respective time period.

18. The non-transitory computer readable medium of claim 16, wherein the compressed representation comprises one or a combination of a log-mel spectrogram representation, a Mel-Frequency Cepstral Coefficients (MFCC) representation, a log fundamental frequency (LFO) representation, or a band aperiodicity (bap) representation.

19. The non-transitory computer readable medium of claim 16, wherein the compressed representation comprises spectrogram magnitudes.

20. The non-transitory computer readable medium of claim 16, wherein the spectrogram magnitudes comprise linear spectrogram magnitudes or log-transformed mel-spectrogram magnitudes.

* * * * *